United States Patent
Zhou

(10) Patent No.: US 9,377,576 B2
(45) Date of Patent: Jun. 28, 2016

(54) COMPOSITE BACK COVER AND BACKLIGHT MODULE WITH ADJUSTABLE CURVATURE

(71) Applicant: Shenzhen China Star Optoelectronics Technology Co., Ltd., Shenzhen, Guangdong (CN)

(72) Inventor: Gege Zhou, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 162 days.

(21) Appl. No.: 14/394,476

(22) PCT Filed: Aug. 26, 2014

(86) PCT No.: PCT/CN2014/085212
§ 371 (c)(1),
(2) Date: Oct. 15, 2014

(87) PCT Pub. No.: WO2016/026157
PCT Pub. Date: Feb. 25, 2016

(65) Prior Publication Data
US 2016/0054512 A1  Feb. 25, 2016

(30) Foreign Application Priority Data

Aug. 19, 2014  (CN) .......................... 2014 1 0413406

(51) Int. Cl.
*F21V 8/00* (2006.01)
*G02F 1/1333* (2006.01)

(52) U.S. Cl.
CPC ........ *G02B 6/0068* (2013.01); *G02F 1/133305* (2013.01); *G02F 1/133308* (2013.01); *G02F 2001/133314* (2013.01)

(58) Field of Classification Search
CPC ............ G02B 6/0068; G02F 1/133305; G02F 1/133308; G02F 2001/133314
See application file for complete search history.

(56) References Cited

U.S. PATENT DOCUMENTS

2016/0088743 A1* 3/2016 Zhang .................. G06F 1/1652
361/679.01

FOREIGN PATENT DOCUMENTS

| CN | 102243427 A | 11/2011 |
|---|---|---|
| CN | 102661556 A | 9/2012 |
| CN | 103814403 A | 5/2014 |

* cited by examiner

*Primary Examiner* — Mary Ellen Bowman
(74) *Attorney, Agent, or Firm* — Andrew C. Cheng

(57) ABSTRACT

A composite back cover with adjustable curvature used in a liquid crystal display with adjustable curvature is provided. The composite back cover includes a fixing plate; a back cover having a central portion secured to the fixing plate; and at least two extensible control devices disposed between the back cover and the fixing plate and respectively arranged at two sides of the central portion. The extensible control devices are stretched or shortened to adjust a distance between the back cover and the fixing plate so as to adjust curvature of the back cover. A backlight module is also provided. The distance between the back cover and the fixing plate is adjusted by stretching or shortening the extensible control devices so as to adjust the curvature of the liquid crystal display.

18 Claims, 4 Drawing Sheets

COMPOSITE BACK COVER AND BACKLIGHT MODULE WITH ADJUSTABLE CURVATURE

FIELD OF THE INVENTION

The present invention relates to a liquid crystal display, and particularly to a composite back cover and a backlight module with adjustable curvature.

BACKGROUND OF THE INVENTION

With evolution of photoelectricity and semiconductor technology, flat panel display is rapidly developed. Among various flat panel displays, liquid crystal display (LCD) becomes the mainstream due to compact size, low power consumption, no radiation and low electromagnetic interference.

A liquid crystal display generally includes a liquid crystal panel and a backlight module (BL). Since the liquid crystal panel does not produce light itself, a backlight module should be disposed under the liquid crystal panel to provide a surface light source required for the liquid crystal panel. Thus, the liquid crystal panel can display images by taking advantage of the surface light source provided by the backlight module.

Recently, major manufactures present curved liquid crystal displays. In general, the curved liquid crystal displays can provide best viewing effect at any viewing angle, while unsatisfied viewing effect occurs at edges of the traditional flat liquid crystal displays. The curved surface of the curved liquid crystal display faces toward the viewer to provide a wider field view. Not only the central position but also the sides of the display bring the same visual delights. Furthermore, image distortion in off-axis in near-watching are reduced. The curved liquid crystal display provides a longer viewing distance to achieve better visual experience.

Therefore, the curved liquid crystal display has advantages over the conventional planar liquid crystal display, e.g. 1. uniqueness; 2. wider viewing angles; 3. reduced image distortion in near-watching. However, the known curved liquid crystal displays have fixed curvature. The fixed curvature thereof has been decided in the factory and can not be adjusted.

SUMMARY OF THE INVENTION

In order to solve the problems of the prior arts, an objective of the present invention provides a composite back cover with adjustable curvature used in a liquid crystal display with adjustable curvature. The composite back cover includes a fixing plate; a back cover having a central portion secured to the fixing plate; and at least two extensible control devices disposed between the back cover and the fixing plate and respectively arranged at two sides of the central portion. The extensible control devices are stretched or shortened to adjust a distance between the back cover and the fixing plate so as to adjust curvature of the back cover.

In an embodiment, the back cover includes a heat sink and a supporting plate. The central portion of the back cover includes an end portion of the supporting plate and an end portion of the heat sink. The end portion of the supporting plate is secured to the fixing plate and the end portion of the heat sink is secured to the end portion of the supporting plate.

In an embodiment, one of the two extensible control devices is disposed between the heat sink and the fixing plate, and the other one of the two extensible control devices is disposed between the supporting plate and the fixing plate.

In an embodiment, the two extensible control devices are symmetrically arranged at two sides of the central portion.

In an embodiment, each of the extensible control devices includes an extensible rod, a top sheet connected to a top end of the extensible rod, and a bottom sheet connected to a bottom end of the extensible rod. The top sheet is fixed to the back cover and the bottom sheet is fixed to the fixing plate.

Another objective of the present invention provides a backlight module with adjustable curvature, including: a fixing plate; a back cover having a central portion secured to the fixing plate; a light guide plate disposed on the back cover and having a incident surface; several light sources disposed on a sidewall of the back cover and disposed close to the incident surface; and at least two extensible control devices disposed between the back cover and the fixing plate and respectively arranged at two sides of the central portion. The extensible control devices are stretched or shortened to adjust a distance between the back cover and the fixing plate so as to adjust curvature of the back cover, and further adjust curvature of the backlight module.

In an embodiment, the back cover includes a heat sink and a supporting plate. The central portion of the back cover includes an end portion of the supporting plate and an end portion of the heat sink. The end portion of the supporting plate is secured to the fixing plate and the end portion of the heat sink is secured to the end portion of the supporting plate.

In an embodiment, a sidewall of the heat sink is the sidewall of the back cover. The light sources are disposed on the sidewall of the heat sink.

In an embodiment, one of the two extensible control devices is disposed between the heat sink and the fixing plate, and the other one of the two extensible control devices is disposed between the supporting plate and the fixing plate.

In an embodiment, the two extensible control devices are symmetrically arranged at two sides of the central portion.

In an embodiment, each of the extensible control devices includes an extensible rod, a top sheet connected to a top end of the extensible rod, and a bottom sheet connected to a bottom end of the extensible rod. The top sheet is fixed to the back cover and the bottom sheet is fixed to the fixing plate.

In the composite back cover and the backlight module with adjustable curvature of the present invention, the distance between the back cover and the fixing plate can be adjusted by stretching or shortening the extensible control devices so as to adjust the curvature of the liquid crystal display.

BRIEF DESCRIPTION OF THE DRAWINGS

The advantages of the present disclosure will become more readily apparent after reviewing the following detailed description and accompanying drawings, in which.

DETAILED DESCRIPTION OF PREFERRED EMBODIMENTS

Figure 1:
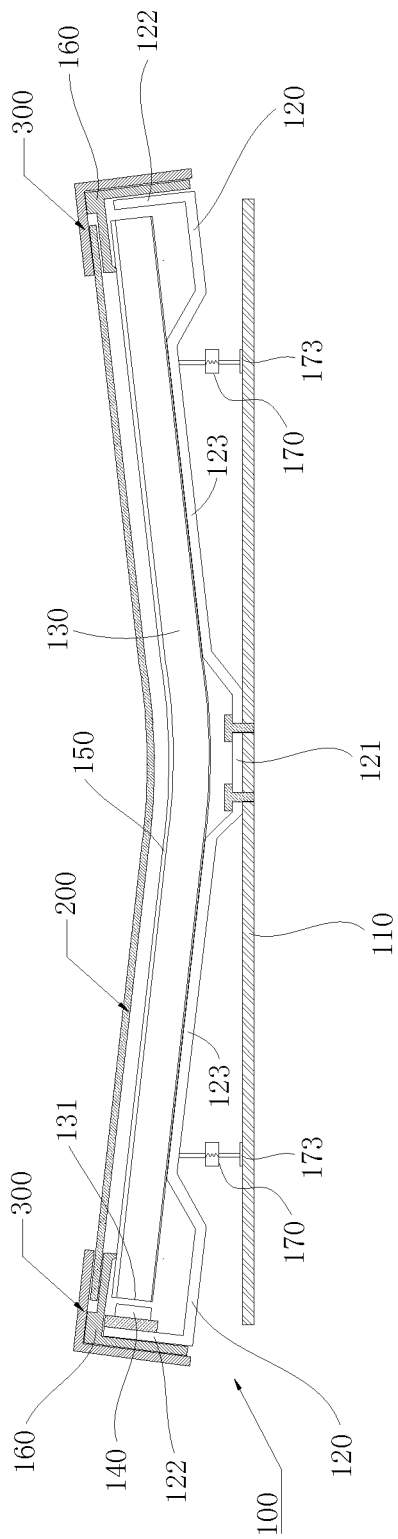
FIG. 1 is a schematic side view illustrating a first embodiment of a liquid crystal display according to the present invention.

The present invention will now be described more specifically with reference to the following drawings. It is to be noted that the present invention may be implemented in various modes. The present invention should not be considered to be limited to the embodiments. The embodiments are presented herein for purpose of illustrating the principles and practical uses of the present invention to allow the person skilled in the arts to realize the embodiments and possible modifications. In the drawings, similar reference number identifies the same element.

Figure 2:
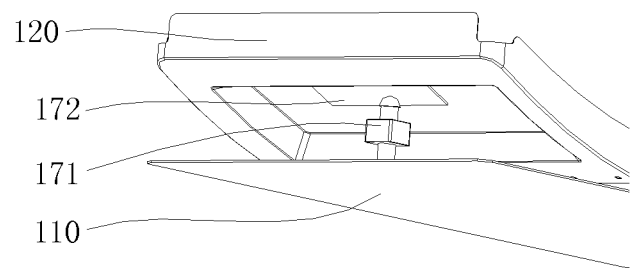
FIG. 2 is a perspective diagram illustrating a portion of a composite back cover with adjustable curvature in the first embodiment of the present invention.

FIG. 1 is a schematic side view illustrating a first embodiment of a liquid crystal display according to the present invention. FIG. 2 is a perspective diagram illustrating a portion of a composite back cover with adjustable curvature in the first embodiment of the present invention.

Please refer to FIG. 1 and FIG. 2, in the first embodiment of the present invention, the liquid crystal device with adjustable curvature includes a backlight module 100, a liquid crystal panel 200 disposed corresponding to the backlight module 100, and a border 300 fixing the backlight module 100 and the liquid crystal panel 200 together. The backlight module 100 and the liquid crystal panel 200 are fixed together through combining the border 300 and the backlight module 100. The backlight module 100 provides a light source for the liquid crystal panel 200 to enable the liquid crystal panel 200 to show images. Furthermore, curvature of the backlight module 100 is adjustable or variable. Curvature change of the backlight module 100 results in curvature change of the liquid crystal panel 200 so that entire curvature of the liquid crystal display in the first embodiment of the present invention is adjustable or variable. It is to be noted that structure of the liquid crystal panel 200 in the first embodiment of the present invention is know to the person skilled in the arts. For the sake of simplification and clarity, it is unnecessary to go into details.

In the first embodiment of the present invention, the backlight module 100 includes a fixing plate 110, a back cover 120, a light guide plate 130, several light sources 140, an optical film 50, a backlight frame 160, a reflector and two expansible adjusting devices 170.

The fixing plate 110 is a flat plate. The back cover 120 is disposed on the fixing plate 110 with a central portion 121 secured to the fixing plate 110. In this embodiment, the central portion 121 of the back cover 120 may be secured to the fixing plate 110 by a fixing member such as a bolt. The light guide plate 130 is disposed on the back cover 120 and has an incident surface 131. A light strip including the light sources 140 is fixed to a sidewall 122 of the back cover 120, and every light source is disposed close to and facing toward the incident surface 131. In this embodiment, the light sources may be light-emitting diodes (LEDs). The optical film 150 is disposed on a top surface of the light guide plate 130 and configured to improve the light going out the top surface of the light guide plate 130. The quantity and type of the optical film 150 may be adjusted to meet practical demands and are not limited herein. The reflector (not shown) is usually disposed between the light guide plate 130 and the back cover 120 and configured to reflect the light from a bottom surface of the light guide plate 130 back to the light guide plate 130 to increase light utilization efficiency. The backlight frame 160 is disposed on the optical film 150 and fixed to the sidewalls 122 and 123 of the back cover 120 so as to secure the optical film 150, the light guide plate 130 and the reflector in the back cover 120.

The back cover 120 further includes two protruding portions 123 symmetrically arranged at both sides of the central portion 121 to increase the structural strength of the backlight module 100. The two extensible control devices 170 are disposed between the back cover 120 and the fixing plate 110 and arranged at both sides of the central portion 121. It is to be understood that the number of the extensible control devices 170 is not limited as shown in FIG. 1. The two extensible control devices 170 can be stretched or shortened under control of the user (e.g. controlling through remote controller). Preferably, the two extensible control devices 170 are symmetrically arranged at both sides of the central portion 121 so that the user can simultaneously control the two extensible control devices 170.

Since the central portion 121 of the back cover 120 is secured to the fixing plate 110, distances between two edges of the back cover 120 and the fixing plate 110 are increased or decreased by stretching or shortening the two extensible control devices 170 so as to adjust the curvature of the back cover 120. The curvature change of the back cover 120 also leads to curvature change of other elements of the backlight module 100 so that the curvature of the backlight module 100 is adjustable or variable.

Moreover, each extensible control device 170 in the first embodiment of the present invention includes an extensible rod 171, a top sheet 172 connected to a top end of the extensible rod 171, and a bottom sheet 173 connected to a bottom end of the extensible rod 171. The top sheet 172 is fixed to a bottom surface of the back cover 120 and the bottom sheet 173 is fixed to a top surface of the fixing plate 110. The extensible rod 171 can be controlled to be stretched or shortened to increase or decrease the distance between the two edges of the back cover 120 and the fixing plate 110 so as to adjust the curvature of the back cover 120.

Figure 3:
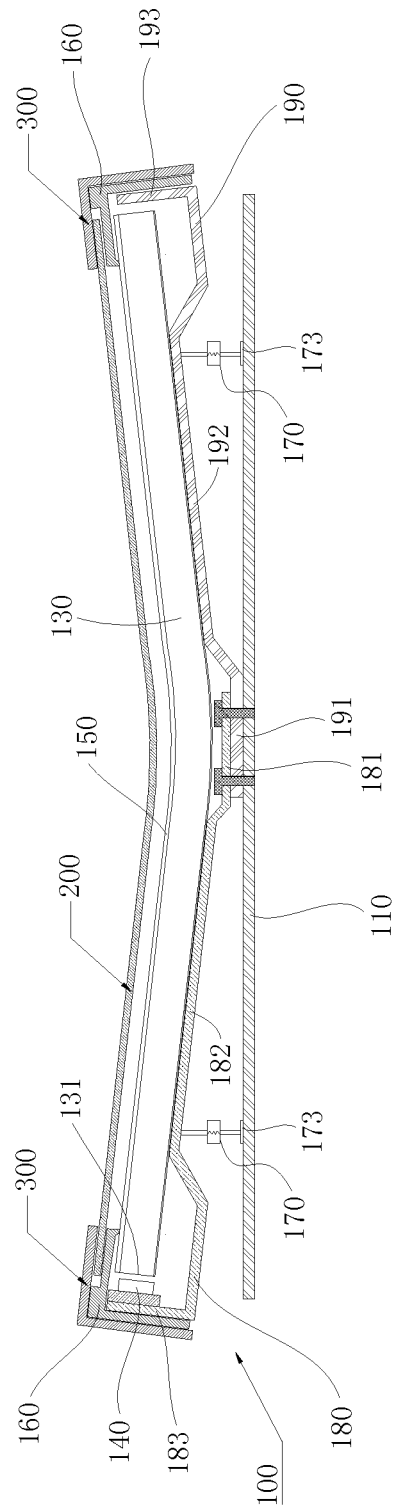
FIG. 3 is a schematic side view illustrating a second embodiment of a liquid crystal display according to the present invention.
Figure 4:
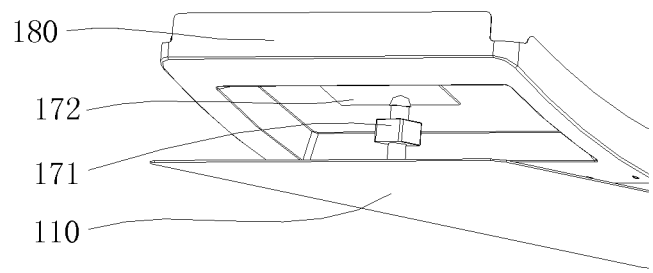
FIG. 4 is a perspective diagram illustrating a portion of a composite back cover with adjustable curvature in the second embodiment of the present invention.

FIG. 3 is a schematic side view illustrating a second embodiment of a liquid crystal display according to the present invention. FIG. 4 is a perspective diagram illustrating a portion of a composite back cover with adjustable curvature in the second embodiment of the present invention.

In the second embodiment, similar features as described with reference to the first embodiment are not repeated, and only differences between them are described. Please refer to FIG. 3 and FIG. 4, wherein the difference from the first embodiment includes that the back cover includes a heat sink 180 and a supporting plate 190. In other words, the back cover in the second embodiment of the present invention is not formed integrally, but consisting of the heat sink 180 and the supporting plate 190. In the embodiment, the heat sink 180 is made of a metal material with good heat dissipation, e.g. aluminum. The supporting plate 190 is made of a metal material with high strength, e.g. iron.

Concretely, the heat sink 180 includes an end portion 181, a protruding portion 182 connected to the end portion 181, and a sidewall 183 connected to the protruding portion 182. The supporting plate 190 includes an end portion 191, a protruding portion 192 connected to the end portion 191, and a sidewall 193 connected to the protruding portion 192. In the embodiment, the central portion of the back cover includes the end portion 191 of the supporting plate 190 and the end portion 181 of the heat sink 180. The end portion 191 of the supporting plate 190 is secured to the fixing plate 110 and the end portion 181 of the heat sink 180 is secured to the end portion 191 of the supporting plate 190. In the embodiment, the end portion 191 of the supporting plate 190, the end portion 181 of the heat sink 180 are sequentially secured to the fixing plate 110 by a fixing member such as a bolt.

It is to be understood that the end portion 181 of the heat sink 180 is secured to the fixing plate 110 and the end portion of the supporting plate 190 is secured to the end portion 181 of the heat sink in an alternative embodiment.

Taken as a whole, the protruding portion 182 of the heat ink 180 and the protruding portion 192 of the supporting plate 190 are symmetrically arranged at two sides of the central portion of the back cover including the end portion 181 and the end portion 191.

Moreover, in an embodiment, in order to dissipate great heat generated from the light strip consisting of the light sources 140, the light strip consisting of the light sources 140 is fixed to the sidewall 183 of the heat sink 180, and every light source 140 is disposed close to and facing toward the incident surface 131 of the light guide plate 130.

One of the extensible control devices 170 is disposed between the heat sink 180 and the fixing plate 110, and the other one of the extensible control devices 170 is disposed between the supporting plate 190 and the fixing plate 110. The two extensible control devices 170 are respectively arranged at two sides of the central portion of the back cover including the end portions 181 and 191. The two extensible control devices 170 can be stretched or shortened under control of the user (e.g. controlling through remote controller). Preferably, the two extensible control devices 170 are symmetrically arranged at both sides of the central portion of the back cover including the end portions 181 and 191 so that the user can simultaneously control the two extensible control devices 170. It is to be understood that the number of the extensible control devices 170 is not limited as shown in FIG. 3.

Since the end portion 181 of the heat sink 180 and the end portion 191 of the supporting 190 are secured to the fixing plate 110, the distance between the heat sink 180 and fixing plate 110 and the distance between the supporting plate 190 and the fixing plate 110 are increased or decreased by stretching or shortening the two extensible control devices 170 so as to adjust the curvature of the heat sink 180 and the supporting plate 190. The curvature changes of the heat sink 180 and the supporting plate 190 also lead to curvature change of other elements of the backlight module so that the curvature of the backlight module is adjustable or variable. Accordingly, the curvature of the liquid crystal display in the second embodiment is also adjustable or variable.

While the disclosure has been described in terms of what is presently considered to be the preferred embodiments, it is to be understood that it is intended to cover various modifications in forms and details included within the spirit and scope of the appended claims and their equivalents.

What is claimed is:

1. A composite back cover with adjustable curvature used in a liquid crystal display with adjustable curvature, the composite back cover comprising:
    a fixing plate;
    a back cover comprising a central portion secured to the fixing plate; and
    at least two extensible control devices disposed between the back cover and the fixing plate and respectively arranged at two sides of the central portion;
    wherein the extensible control devices are stretched or shortened to adjust a distance between the back cover and the fixing plate so as to adjust curvature of the back cover.

2. The composite back cover according to claim 1, wherein the back cover comprises a heat sink and a supporting plate, the central portion of the back cover comprising an end portion of the supporting plate and an end portion of the heat sink, the end portion of the supporting plate being secured to the fixing plate and the end portion of the heat sink being secured to the end portion of the supporting plate.

3. The composite back cover according to claim 2, wherein one of the two extensible control devices is disposed between the heat sink and the fixing plate, and the other one of the two extensible control devices is disposed between the supporting plate and the fixing plate.

4. The composite back cover according to claim 1, wherein the two extensible control devices are symmetrically arranged at two sides of the central portion.

5. The composite back cover according to claim 2, wherein the two extensible control devices are symmetrically arranged at two sides of the central portion.

6. The composite back cover according to claim 3, wherein the two extensible control devices are symmetrically arranged at two sides of the central portion.

7. The composite back cover according to claim 1, wherein each of the extensible control devices comprises an extensible rod, a top sheet connected to a top end of the extensible rod, and a bottom sheet connected to a bottom end of the extensible rod, the top sheet being fixed to the back cover and the bottom sheet being fixed to the fixing plate.

8. The composite back cover according to claim 2, wherein each of the extensible control devices comprises an extensible rod, a top sheet connected to a top end of the extensible rod, and a bottom sheet connected to a bottom end of the extensible rod, the top sheet being fixed to the back cover and the bottom sheet being fixed to the fixing plate.

9. The composite back cover according to claim 3, wherein each of the extensible control devices comprises an extensible rod, a top sheet connected to a top end of the extensible rod, and a bottom sheet connected to a bottom end of the extensible rod, the top sheet being fixed to the back cover and the bottom sheet being fixed to the fixing plate.

10. A backlight module with adjustable curvature, comprising:
    a fixing plate;
    a back cover comprising a central portion secured to the fixing plate;
    a light guide plate disposed on the back cover and having an incident surface;
    a plurality of light sources disposed on a sidewall of the back cover and disposed close to the incident surface; and
    at least two extensible control devices disposed between the back cover and the fixing plate and respectively arranged at two sides of the central portion;
    wherein the extensible control devices are stretched or shortened to adjust a distance between the back cover and the fixing plate to adjust curvature of the back cover, and further adjust curvature of the backlight module.

11. The backlight module according to claim 10, wherein the back cover comprises a heat sink and a supporting plate, a sidewall of the heat sink being the sidewall of the back cover, the central portion of the back cover comprising an end portion of the supporting plate and an end portion of the heat sink, the end portion of the supporting plate being secured to the fixing plate and the end portion of the heat sink being secured to the end portion of the supporting plate.

12. The backlight module according to claim 10, wherein one of the two extensible control devices is disposed between the heat sink and the fixing plate, and the other one of the two extensible control devices is disposed between the supporting plate and the fixing plate.

13. The backlight module according to claim 10, wherein the two extensible control devices are symmetrically arranged at two sides of the central portion.

14. The backlight module according to claim 11, wherein the two extensible control devices are symmetrically arranged at two sides of the central portion.

15. The backlight module according to claim 12, wherein the two extensible control devices are symmetrically arranged at two sides of the central portion.

16. The backlight module according to claim 10, wherein each of the extensible control devices comprises an extensible rod, a top sheet connected to a top end of the extensible rod, and a bottom sheet connected to a bottom end of the extensible rod, the top sheet being fixed to the back cover and the bottom sheet being fixed to the fixing plate.

17. The backlight module according to claim 11, wherein each of the extensible control devices comprises an extensible rod, a top sheet connected to a top end of the extensible rod, and a bottom sheet connected to a bottom end of the extensible rod, the top sheet being fixed to the back cover and the bottom sheet being fixed to the fixing plate.

18. The backlight module according to claim 12, wherein each of the extensible control devices comprises an extensible rod, a top sheet connected to a top end of the extensible rod, and a bottom sheet connected to a bottom end of the extensible rod, the top sheet being fixed to the back cover and the bottom sheet being fixed to the fixing plate.

\* \* \* \* \*